(12) United States Patent
Uebele et al.

(10) Patent No.: US 10,486,103 B2
(45) Date of Patent: Nov. 26, 2019

(54) USING LITHIUM HYDROXIDE TO SCRUB CARBON DIOXIDE FROM GAS TURBINE

(71) Applicant: General Electric Company, Schenectady, NY (US)

(72) Inventors: Todd Richard Uebele, Houston, TX (US); Doanh Thuc Tran, Spring, TX (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 59 days.

(21) Appl. No.: 15/290,157

(22) Filed: Oct. 11, 2016

(65) Prior Publication Data

US 2018/0099247 A1 Apr. 12, 2018

(51) Int. Cl.
*F02C 3/34* (2006.01)
*F02C 3/30* (2006.01)
*B01D 53/62* (2006.01)
*B01D 53/75* (2006.01)
*B01D 53/78* (2006.01)
(Continued)

(52) U.S. Cl.
CPC ............ *B01D 53/62* (2013.01); *B01D 53/75* (2013.01); *B01D 53/78* (2013.01); *B01D 53/83* (2013.01); *F01N 3/0205* (2013.01); *F01N 3/0857* (2013.01); *F01N 3/18* (2013.01); *F02C 3/04* (2013.01); *B01D 53/96* (2013.01); *B01D 2251/302* (2013.01); *B01D 2251/604* (2013.01); *B01D 2257/504* (2013.01); *B01D 2258/01* (2013.01); *F01N 2570/10* (2013.01); *F02C 3/30* (2013.01); *F02C 3/34* (2013.01); *F05D 2260/61* (2013.01); *Y02C 10/04* (2013.01); *Y02T 10/20* (2013.01)

(58) Field of Classification Search
CPC .......... F02C 3/30; F02C 3/34; F01N 2570/10; B01D 53/62; B01D 53/78; B01D 2257/504; B01D 2251/302; B01D 2251/604; B01D 2258/01; F23C 9/00; F05D 2260/61
See application file for complete search history.

(56) References Cited

U.S. PATENT DOCUMENTS 2,395,842 A * 3/1946 Borgstrom ............. B01D 53/02
252/190
2,629,652 A * 2/1953 Schechter ............. A62B 19/00
23/293 R
(Continued)

*Primary Examiner* — William H Rodriguez
(74) *Attorney, Agent, or Firm* — Fletcher Yoder, P.C.

(57) ABSTRACT

A system includes a gas turbine system and an aftertreatment system coupled to an exhaust outlet of the gas turbine system and configured to treat exhaust gases exiting the exhaust outlet. The aftertreatment system includes a cooling unit configured to cool the exhaust gases and a carbon dioxide ($CO_2$) treatment unit coupled to the cooling unit and configured to treat cooled exhaust gases by reducing an amount of $CO_2$ in the cooled exhaust gases with lithium hydroxide (LiOH). The aftertreatment system includes a LiOH supply unit coupled to the $CO_2$ treatment unit and configured to feed LiOH into the $CO_2$ treatment unit such that a reaction between LiOH and $CO_2$ occurs inside the $CO_2$ treatment unit to convert $CO_2$ into lithium carbonate ($Li_2CO_3$) and water ($H_2O$). The aftertreatment system also includes a treated exhaust outlet coupled to the $CO_2$ treatment unit and configured to discharge treated exhaust gases.

18 Claims, 2 Drawing Sheets

(51) Int. Cl.
  *F01N 3/02* (2006.01)
  *F01N 3/08* (2006.01)
  *F01N 3/18* (2006.01)
  *F02C 3/04* (2006.01)
  *B01D 53/83* (2006.01)
  *B01D 53/96* (2006.01)

(56) References Cited

U.S. PATENT DOCUMENTS

| | | | | |
|---|---|---|---|---|
| 3,906,945 A * | 9/1975 | Netteland | A62B 19/00 | 128/205.28 |
| 4,039,620 A * | 8/1977 | Netteland | A62B 19/00 | 423/230 |
| 4,206,429 A * | 6/1980 | Pinsley | H01S 3/0953 | 372/55 |
| 4,941,112 A * | 7/1990 | Nepveu De Villemarceau | G21C 17/022 | 376/277 |
| 5,857,324 A * | 1/1999 | Scappatura | B01D 53/922 | 60/274 |
| 2003/0224504 A1 * | 12/2003 | Blais | B01D 53/864 | 435/266 |
| 2006/0037478 A1 * | 2/2006 | Mori | B01D 53/02 | 96/108 |
| 2011/0143195 A1 * | 6/2011 | Ito | H01M 4/134 | 429/199 |
| 2011/0314815 A1 * | 12/2011 | Li | F01K 23/105 | 60/645 |
| 2012/0216547 A1 * | 8/2012 | Li | F01K 23/10 | 60/772 |
| 2012/0227372 A1 * | 9/2012 | Li | F01K 7/38 | 60/39.182 |
| 2013/0272938 A1 * | 10/2013 | Schmid | B01D 53/508 | 423/224 |
| 2014/0020730 A1 * | 1/2014 | Imran | H01L 35/30 | 136/205 |
| 2014/0290264 A1 * | 10/2014 | Hovel | F01M 23/10 | 60/772 |
| 2015/0007579 A1 * | 1/2015 | Curran | F01K 23/10 | 60/772 |
| 2015/0017489 A1 * | 1/2015 | Visconti | B01D 53/0407 | 429/57 |
| 2015/0047366 A1 * | 2/2015 | Carroni | F01K 23/101 | 60/779 |

* cited by examiner

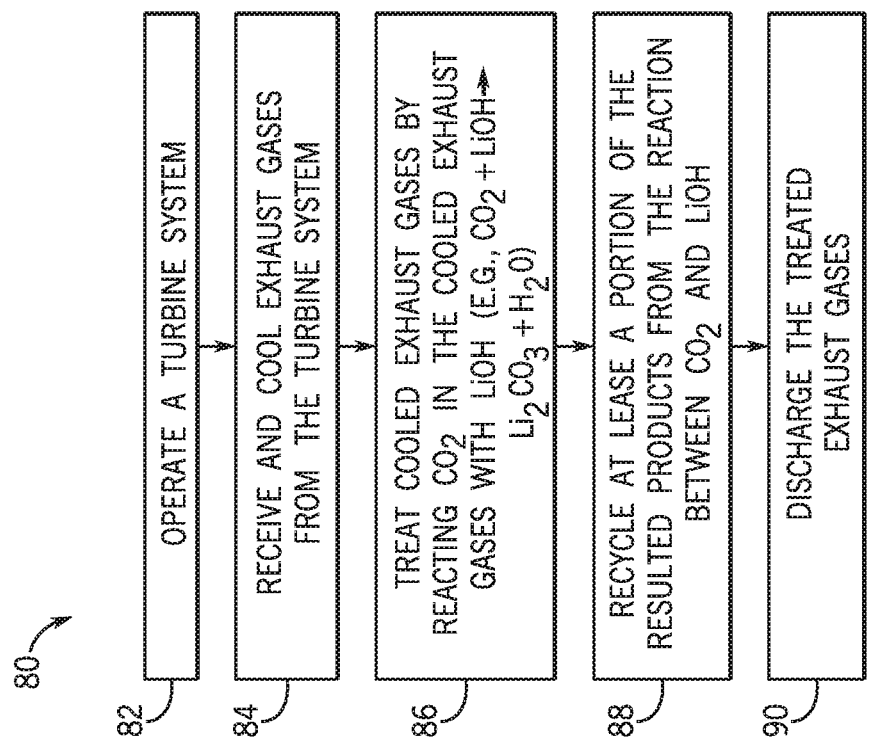

USING LITHIUM HYDROXIDE TO SCRUB CARBON DIOXIDE FROM GAS TURBINE

BACKGROUND

This disclosure relates to gas turbine engines and more particularly relates to removal of carbon dioxide ($CO_2$) from exhaust gases of gas turbine engines.

Gas turbines are used to generate power for various applications. A conventional gas turbine engine such as an aeroderivative gas turbine engine may produce as much as 600 tons of $CO_2$ per day from the gas turbine engine exhaust. Due to environmental aspects of $CO_2$ as a greenhouse house gas and restrictions on $CO_2$ emissions, there is a desire for an aftertreatment system that reduces the $CO_2$ emission into the atmosphere from a turbine engine, in particular from exhaust gases of the gas turbine engine. It is preferred that an aftertreatment system will treat the $CO_2$ from the exhaust gases of the gas turbine engine in a cost effective manner.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In a first embodiment, a system includes a gas turbine system, which includes a compressor, a combustion section, a turbine, and an exhaust outlet. The system also includes an aftertreatment system coupled to an exhaust outlet of the gas turbine system and configured to treat exhaust gases exiting the exhaust outlet. The aftertreatment system includes a cooling unit configured to cool the exhaust gases and a carbon dioxide ($CO_2$) treatment unit coupled to the cooling unit and configured to treat cooled exhaust gases by reducing an amount of $CO_2$ in the cooled exhaust gases with lithium hydroxide (LiOH). The aftertreatment system includes a LiOH supply unit coupled to the $CO_2$ treatment unit and configured to feed LiOH into the $CO_2$ treatment unit such that a reaction between LiOH and $CO_2$ occurs inside the $CO_2$ treatment unit to convert $CO_2$ into lithium carbonate ($Li_2CO_3$) and water ($H_2O$). The aftertreatment system also includes a treated exhaust outlet coupled to the $CO_2$ treatment unit and configured to discharge treated exhaust gases.

In a second embodiment, an aftertreatment system configured to couple to a gas turbine system includes a cooling unit configured to cool exhaust gases from the gas turbine system and a carbon dioxide ($CO_2$) treatment unit coupled to the cooling unit and configured to receive and to treat cooled exhaust gases with lithium hydroxide (LiOH). The aftertreatment system includes a LiOH supply unit coupled to the $CO_2$ treatment unit and configured to feed LiOH into the $CO_2$ treatment unit such that a reaction between LiOH and $CO_2$ occurs inside the $CO_2$ treatment unit to convert $CO_2$ into lithium carbonate ($Li_2CO_3$) and water ($H_2O$). The aftertreatment system includes a valve assembly configured to regulate one or more flows into and out of the $CO_2$ treatment unit, wherein the valve assembly comprises one or more valves. The aftertreatment system includes an outlet coupled to the $CO_2$ treatment unit and configured to discharge treated exhaust gases. The aftertreatment system also includes a controller coupled to the aftertreatment system and programmed to control operation of the aftertreatment system.

In a third embodiment, a method for using an aftertreatment system to treat exhaust gases from a turbine system includes receiving the exhaust gases from the turbine system and cooling the exhaust gases using a cooling unit. The method includes treating cooled exhaust gases inside a carbon dioxide ($CO_2$) treatment unit by reacting $CO_2$ in the exhaust gases with lithium hydroxide (LiOH). The method also includes recycling at least a portion of resulting products from a reaction between $CO_2$ and LiOH, and discharging treated exhaust gases.

BRIEF DESCRIPTION OF THE DRAWINGS

These and other features, aspects, and advantages of the present subject matter will become better understood when the following detailed description is read with reference to the accompanying drawings in which like characters represent like parts throughout the drawings, wherein:

FIG. 2 is a flow chart illustrating a method for operating the aftertreatment system shown in FIG. 1 for treating $CO_2$ from exhaust gases of the turbine system, in accordance with an embodiment.

DETAILED DESCRIPTION

Figure 1:
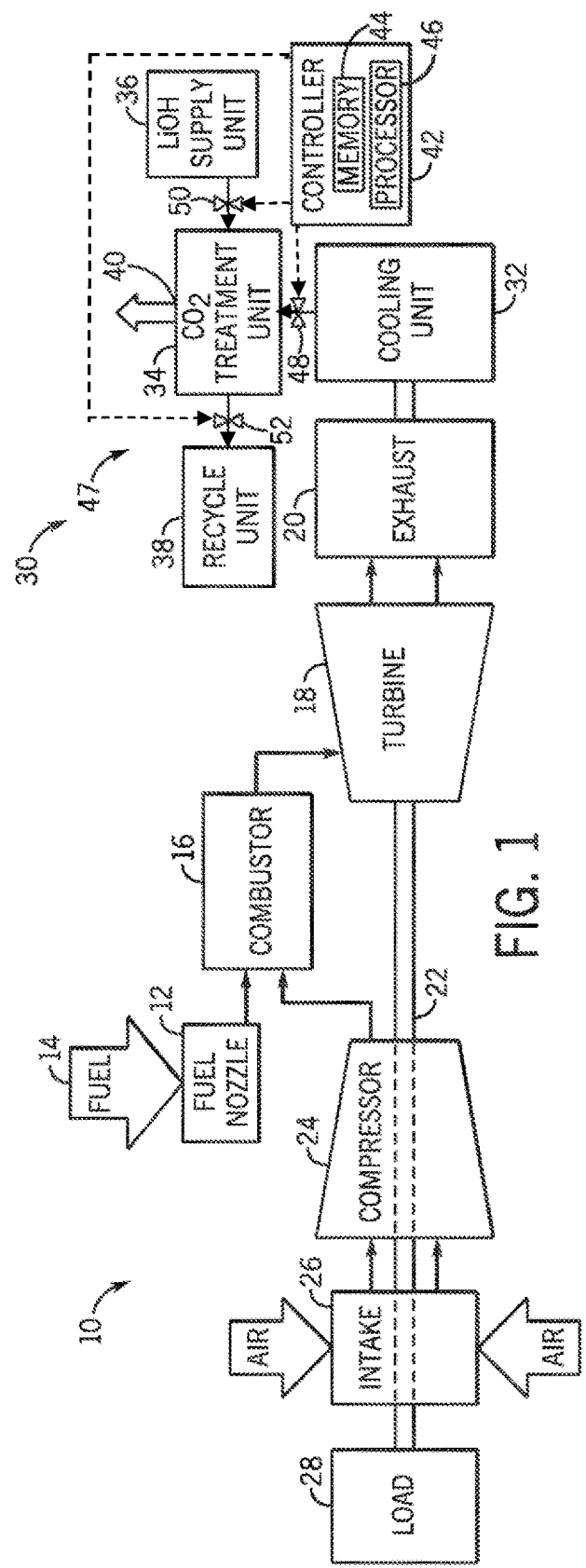
FIG. 1 is a schematic illustration of a turbine system including an aftertreatment system to treat carbon dioxide ($CO_2$) in turbine exhaust gases, in accordance with an embodiment.

One or more specific embodiments of the present subject matter will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present subject matter, the articles "a," "an," "the," and "said" are intended to mean that there are one or more of the elements. The terms "comprising," "including," and "having" are intended to be inclusive and mean that there may be additional elements other than the listed elements.

As described below, an aftertreatment system may be developed to treat carbon dioxide (CO2) from exhaust gases of gas turbine engines. More specifically, the aftertreatment system may use lithium hydroxide (LiOH) to treat CO2 from the exhaust gases based on a chemical reaction between LiOH and CO2 (e.g., reactants) to form lithium carbonate (Li2CO3) and water (H2O) (e.g., products); thereby reducing the emission of CO2. The aftertreatment system may include a cooling unit (e.g., any conventional heat exchanger, including an air cooled or water cooled heat exchanger, a shell and tube heat exchanger, a plate heat exchanger, an adiabatic wheel heat exchanger, a fluid heat exchanger, a waste heat recovery unit, a phase-change heat exchanger or a direct contact heat exchanger) coupled to an exhaust outlet of the gas turbine engine and configured to cool the exhaust gases to a temperature at or below approximately 300 degree Fahrenheit (° F.) or approximately 149 degree Celsius (° C.). The cooled exhaust gases may pass through a CO2 treatment unit, where the chemical reaction between CO2 and LiOH takes place converting CO2 and LiOH into Li2CO3 and H2O. The CO2 treatment unit may be coupled to a LiOH supply unit that replenishes the amount of LiOH in the CO2 treatment unit. The CO2 treatment unit may be coupled to a recycle unit, which is configured to recycle or collect Li2CO3 and/or H2O from the CO2 treatment unit. For example, Li2CO3 and/or H2O may be collected for sale or other uses, thereby helping to mitigate costs of the aftertreatment system. The treated exhaust gases may be discharged (e.g., to the atmosphere) with reduced amount of CO2.

There may be a valve assembly including one or more valves (e.g., valves or control valves) to regulate flow(s) into and/or out of the CO2 treatment unit. For example, there may be a valve (e.g., control valve) disposed between the cooling unit and the CO2 treatment unit to control the flow of the cooled exhaust gases into the CO2 treatment unit (e.g., flow rate). There may be a valve (e.g., control valve) disposed between the LiOH supply unit and the CO2 treatment unit to control the LiOH supply into the CO2 treatment unit (e.g., open/close position of the valve, amount, flow rate). There may be a valve (e.g., control valve) disposed between the CO2 treatment unit and the recycle unit. A controller may be coupled to the control valves and may regulate the flow from the cooling unit to the CO2 treatment unit and regulate the flow of LiOH from the LiOH supply unit to the CO2 treatment unit (e.g., via control signals provided to actuators to open and close the valves). The cooling unit may also be connected to the controller such that the controller may control/regulate the heat exchanger as to achieve the desired cooling effect (e.g., at or below approximately 300° F. or approximately 149° C.). The controller may be a dedicated controller for the aftertreatment system or may be a controller of the turbine engine. As such, the aftertreatment system may reduce the CO2 emission of the gas turbine engine, and preferably in an economical manner since recycling of the resulted products of the CO2 treatment reaction may recover a portion of the costs of the aftertreatment system.

FIG. 1 is a schematic illustration of a turbine system 10 (e.g., a gas turbine engine) including an aftertreatment system to treat carbon dioxide (CO2) in turbine exhaust gases, in accordance with an embodiment. The turbine system 10 may use liquid or gas fuel, such as natural gas and/or a hydrogen rich synthetic gas, to drive the turbine system 10. As depicted, fuel nozzles 12 (e.g., multi-tube fuel nozzles) intake a fuel supply 14, mix the fuel with an oxidant, such as air, oxygen, oxygen-enriched air, oxygen reduced air, or any combination thereof. Although the following discussion refers to the oxidant as the air, any suitable oxidant may be used with the disclosed embodiments. Once the fuel and air have been mixed, the fuel nozzles 12 distribute the fuel-air mixture into a combustor 16 in a suitable ratio for optimal combustion, emissions, fuel consumption, and power output. The turbine system 10 may include one or more fuel nozzles 12 located inside one or more combustors 16. The fuel-air mixture combusts in a chamber within the combustor 16, thereby creating hot pressurized exhaust gases. The combustor 16 directs the exhaust gases through a turbine 18 toward an exhaust outlet 20. As the exhaust gases pass through the turbine 18, the gases force turbine blades to rotate a shaft 22 along an axis of the turbine system 10. As illustrated, the shaft 22 may be connected to various components of the turbine system 10, including a compressor 24. The compressor 24 also includes blades coupled to the shaft 22. As the shaft 22 rotates, the blades within the compressor 24 also rotate, thereby compressing air from an air intake 26 through the compressor 24 and into the fuel nozzles 12 and/or combustor 16. The shaft 22 may also be connected to a load 28, which may be a vehicle or a stationary load, such as an electrical generator in a power plant or a propeller on an aircraft, for example. The load 28 may include any suitable device capable of being powered by the rotational output of the turbine system 10.

The gas turbine system 10 may include an aftertreatment system 30 connected with the exhaust outlet 20 to treat CO2 in the exhaust gases. In the illustrated embodiment, the aftertreatment system 30 includes a cooling unit 32, a CO2 treatment unit 34, a LiOH supply unit 36 (e.g., a storage bin, a feeder, a screw type feeder, and/or conveyor), a recycle unit 38, an outlet 40 (e.g., treated exhaust outlet), and a controller 42. It will be appreciated that the operation of the aftertreatment system 30 is controlled/regulated by the controller 42. In the illustrated embodiment, the controller 42 includes a memory 44 (e.g., a non-transitory computer-readable medium/memory circuitry) storing one or more sets of instructions (e.g., processor-executable instructions) implemented to operate the aftertreatment system 30. The controller 42 also includes one or more processor 46 configured to access and execute the one or more sets of instructions encoded by the memory 44, associated with the aftertreatment system 30 to perform the CO2 treatment operation, associated with the cooling unit 32, among other functions.

For example, the controller 42 may be coupled to a valve assembly including one or more valves (e.g., control valves) to regulate flow(s) into and/or out of the CO2 treatment unit. For example, the controller 42 may be coupled to a valve (e.g., control valve) disposed between the cooling unit and the CO2 treatment unit to control and regular the flow of the cooled exhaust gases into the CO2 treatment unit. The controller 42 may be coupled to a valve (e.g., control valve) disposed between the LiOH supply unit and the CO2 treatment unit to control and regulate the flow of LiOH from the LiOH supply unit into the CO2 treatment unit (e.g., via control signals provided to actuators to open and close the valves). The controller 42 may be coupled to a valve (e.g., control valve) disposed between the CO2 treatment unit and the recycle unit to control and regulate the flow of Li2CO3 and/or H2O into the recycle unit. It may be appreciated that the controller 42 may be a dedicated controller for the CO2 treatment process or the controller 42 may be the same controller that controls and regulates the operation of the turbine system 10.

The memory 44 may include volatile memory, such as random access memory (RAM), and/or non-volatile memory, such as read-only memory (ROM), optical drives, hard disc drives, or solid-state drives. Additionally, the one or more processor 46 may include one or more application specific integrated circuits (ASICs), one or more field programmable gate arrays (FPGAs), one or more general purpose processors, or any combination thereof. Furthermore, the term processor is not limited to just those integrated circuits referred to in the art as processors, but broadly refers to computers, processors, microcontrollers, microcomputers, programmable logic controllers, application specific integrated circuits, and other programmable circuits.

In the illustrated embodiment, the cooling unit 32, such as any conventional heat exchanger (e.g., air cooled or water cooled heat exchanger, a shell and tube heat exchanger, a plate heat exchanger, an adiabatic wheel heat exchanger, a fluid heat exchanger, a waste heat recovery unit, a phase-change heat exchanger or a direct contact heat exchanger) is configured to receive the exhaust gases from the exhaust outlet 20 and cool the exhaust gases to a desired temperature. For example, a desirable temperature for a CO2 treatment process described below may be at or below approximately 300° F. (149° C.). The cooling unit 32 may be connected to the controller 42 such that the controller 42 may control/regulate the heat exchanger as to achieve the desired cooling effect (e.g., to cool to or below a desired temperature).

The CO2 treatment unit 34 is coupled to the cooling unit 32 to receive the cooled exhaust gases from the cooling unit 34. The CO2 treatment unit 34 is also coupled to the LiOH supply unit 36 to receive LiOH from the LiOH supply unit 36 to treat CO2 in the cooled exhaust gases. For example, the CO2 treatment unit 34 may be coupled to the LiOH supply unit 36 which may be a storage bin, a feeder, a screw type feeder, and/or conveyor configure to supply LiOH to the CO2 treatment unit 34. Specifically, CO2 in the cooled exhaust gases is treated by chemically reacting CO2 with LiOH such that both CO2 and LiOH are consumed as reactants, and Li2CO3 and H2O are formed as products (e.g., $CO_2$ (g)+LiOH (s)→$Li_2CO_3$ (s)+$H_2O$ (g), wherein "g" denotes gaseous state and "s" denotes solid state). Herein a CO2 treatment efficiency or conversion rate is defined as the reduction of CO2 content in the treated exhaust gases divided by the original CO2 content in the cooled exhaust gases before the CO2 treatment (e.g., the cooled exhaust gases entering the CO2 treatment unit 34). The CO2 treatment efficiency may be at or greater than approximately 60%, approximately 70%, approximately 80%, approximately 85%, approximately 90%, or approximately 95%.

It may be appreciated that the CO2 treatment efficiency may depend on factors such as a residence time of the cooled exhaust gases in the CO2 treatment unit 34, the amount and/or rate of the LiOH supply, and the reactivity of LiOH, among others. For example, the CO2 treatment efficiency may generally increase as the residence time increases when the residence time is below a threshold reaction time (e.g., time takes for a chemical reaction to fully or substantially fully complete), and the CO2 treatment efficiency may saturate when the residence time is substantially equal to or longer than the threshold reaction time. For example, the CO2 treatment efficiency may generally increase as the amount of LiOH increases when the amount of LiOH is below an equilibrium amount (e.g., chemical equilibrium between CO2 and LiOH), and the CO2 treatment efficiency may saturate when the amount of LiOH is substantially equal to or more than the equilibrium amount. For example, the CO2 treatment efficiency may generally increase as the reactivity of LiOH increases (e.g., CO2 and LiOH may more effectively react with one another). The reactivity of LiOH may increase as the particle size of LiOH decrease or as the distribution of LiOH is more uniform than clustered (e.g., as to provide a larger reaction surface area for CO2).

In the illustrated embodiment, the aftertreatment system 30 includes a valve assembly 47 configured to regulate or control flow(s) into and/or out of the CO2 treatment unit 34. The valve assembly 47 may include one or more valves such as a control valve 48 disposed between the cooling unit 32 and the CO2 treatment unit 34, a control valve 50 disposed between the LiOH supply unit 36 and the CO2 treatment unit 34 (e.g., to control or regulate the flow of LiOH from a storage bin, a feeder, a screw type feeder, and/or conveyor), and a control valve 52 disposed between the recycle unit 38 and the CO2 treatment unit 34 (e.g., to control or regulate the flow of Li2CO3 and/or H2O from the CO2 treatment unit 34 into the recycle unit 38). The valve assembly 47 is controlled by the controller 42 (e.g., via an actuator) to control/regulate the amount and rate of flow(s) into and/or out of the CO2 treatment unit 34 (e.g., the cooled exhaust gas flow (e.g., control valve 48) and the LiOH flow/supply (e.g., control valve 50) into the CO2 treatment unit 34, and Li2CO3 and/or H2O flow out of the CO2 treatment unit 34 (e.g., control valve 52)). As such, the controller 42 may control the operational parameters of the aftertreatment system 30 (e.g., flow rate of cooled exhaust gases, amount of LiOH, flow rate of LiOH, etc.) by controlling the valve assembly 47. The controller 42 may receive instructions (e.g., instructions from an operator, a user or from the turbine system 10) to control the aftertreatment system 30. The controller 42 may control the operational parameters of the aftertreatment system 30 based on pre-determined values (e.g., pre-determined flow rates, timed open/close position). The controller 42 may control the operational parameters to control the residence time of the cooled exhaust gases in the CO2 treatment unit 34, and thereby control the CO2 treatment efficiency. The controller 42 may output the operational parameters.

In an alternative embodiment, one or both of the control valves 48 and 52 may be replaced by check valve(s), and control valve 50 may be replaced by a check valve (e.g., LiOH flow rate and/or amount is controlled by the LiOH supply unit 36 such as the supply speed of a LiOH conveyor). In the case that all of the control valves 48, 50, and 52 are replaced by check valves, the aftertreatment system 30 does not include the controller 42 to control or regulate the flows (e.g., cooled and treated exhaust gases and LiOH) into and out of the CO2 treatment unit 34.

In the illustrated embodiment, the recycle unit 38 is coupled to the CO2 treatment unit 34 and is configured to recycle the resulting products, Li2CO3 and/or H2O, of the CO2 treatment reaction (e.g., via separation process(s)). For example, the recycle unit 38 may include a solid separator or filter to separate and collect Li2CO3 from the CO2 treatment unit 34. For example, the recycle unit 38 may include a steam separator to separate and collect H2O from the CO2 treatment unit 34. It may be appreciated that since the recycled Li2CO3 and/or H2O may be sold for profits or other uses (e.g., the price of Li2CO3 may be approximately equal to or higher than the price of LiOH), recycling Li2CO3 and/or H2O may help mitigate the costs (e.g., installation and operational costs) of the aftertreatment system 30. As such, the turbine system 10 having the aftertreatment system 30 may generate electricity while reducing its own carbon footprint economically (e.g., reduced CO2 emission as compared to a gas turbine without the aftertreatment system 30). It may also be appreciated that the CO2 treatment process as set forth above may be a continuous process as opposed to a batch process.

FIG. 2 is a flow chart illustrating a method 80 for operating the aftertreatment system 30 shown in FIG. 1 for treating CO2 from the exhaust gases of the turbine system 10. One or more steps of the method 80 may be executed by the controller 42. The method 80 includes operating the turbine system 10 (step 82) and receiving and cooling exhaust gases from the turbine system 10 (step 84). The method 80 includes treating cooled exhaust gases by reacting CO2 in the cooled exhaust gases with LiOH (step 86). The method 80 also includes recycling at least a portion of the resulted products from the reaction between CO2 and LiOH (step 88) and discharging the treated exhaust gases (step 90). In particular, upon beginning operation of the turbine system 10 (step 82), the exhaust gases discharged from the exhaust outlet 20 are directed to flow to (e.g., received by) the cooling unit 32, where the exhaust gases are cooled to the desired temperature (e.g., approximately at or below 300° F. or 149° C.) (step 84). The cooled exhaust gases are directed to flow through the aftertreatment system 30, where the CO2 is consumed or converted by the chemical reaction with LiOH (e.g., CO2+LiOH→Li2CO3+H2O, taking place inside the CO2 treatment unit 34) (step 86), at one or both of the products of the chemical reaction, Li2CO3 and H2O, are recycled by the recycle unit 38 (step 88), and the treated exhaust gases are discharged through the outlet 52 (step 90). It may be appreciated that the steps 84, 86, 88, and 90 are a continuous process or substantially continuous process such that the exhaust gases flow from the exhaust outlet 20 of the turbine system 10 are continuously being treated by the aftertreatment system 30 as the chemical reaction (e.g., CO2+LiOH→Li2CO3+H2O) occurs continuously to consume or convert CO2 in the exhaust gases. The CO2 treatment efficiency may depend on the residence time of the exhaust gases in the CO2 treatment unit 34, and the residence time may be controlled by changing the operational parameters of the aftertreatment system 30, such as changing the open/close position(s) and/or flow rate(s) through some or all of the control valves 48, 50, and 52. For example, the control valves 48, 50, and 52 may receive instructions from the controller 42 as to change the open/close position of the valve and/or to change the flow rate and/or flow amount.

This written description uses examples to disclose the subject matter, including the best mode, and also to enable any person skilled in the art to practice the subject matter, including making and using any devices or systems and performing any incorporated methods. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
   a gas turbine system comprising:
   a compressor;
   a combustion section;
   a turbine; and
   an exhaust outlet; and
   an aftertreatment system coupled to an exhaust outlet of the gas turbine system and configured to treat exhaust gases exiting the exhaust outlet, comprising:
   a cooling unit configured to cool the exhaust gases;
   a carbon dioxide ($CO_2$) treatment unit coupled to the cooling unit and configured to treat cooled exhaust gases by reducing an amount of $CO_2$ in the cooled exhaust gases with lithium hydroxide (LiOH);
   a LiOH supply unit coupled to the $CO_2$ treatment unit and configured to feed LiOH into the $CO_2$ treatment unit such that a reaction between LiOH and $CO_2$ occurs inside the $CO_2$ treatment unit to convert $CO_2$ into lithium carbonate (Li2CO3) and water (H2O); and
   a treated exhaust outlet coupled to the $CO_2$ treatment unit and configured to discharge treated exhaust gases;
   wherein the $CO_2$ treatment unit is configured to convert at least 60% of $CO_2$ into Li2CO3 and H2O.

2. The system of claim 1, wherein the aftertreatment system comprises a recycle unit coupled to the $CO_2$ treatment unit and configured to collect Li2CO3 and/or H2O from the $CO_2$ treatment unit.

3. The system of claim 1, wherein the cooling unit is configured to cool the exhaust gases to a temperature at or below 149° C.

4. The system of claim 1, wherein the $CO_2$ treatment unit is configured to convert at least 85% of $CO_2$ into Li2CO3 and H2O.

5. The system of claim 1, wherein the aftertreatment system comprises a valve assembly configured to regulate one or more flows into and out of the $CO_2$ treatment unit.

6. The system of claim 5, wherein the valve assembly comprises a first valve disposed between the cooling unit and the $CO_2$ treatment unit and a second valve disposed between the LiOH supply unit and the $CO_2$ treatment unit.

7. The system of claim 1, comprises a controller coupled to the aftertreatment system and programmed to control operation of the aftertreatment system.

8. The system of claim 7, wherein the controller is programmed to control a first control valve disposed between the cooling unit and the $CO_2$ treatment unit to regulate rate of the cooled exhaust gases into the $CO_2$ treatment unit.

9. The system of claim 7, wherein the controller is programmed to control a second control valve disposed between the LiOH supply unit and the $CO_2$ treatment unit to regulate amount and/or rate of LiOH fed into to the $CO_2$ treatment unit.

10. The system of claim 1, wherein the aftertreatment system is directly coupled to the exhaust outlet of the gas turbine system and configured to directly receive the exhaust gases exiting the exhaust outlet, and the cooling unit is directly coupled to the exhaust outlet of the gas turbine system and configured to directly receive the exhaust gases exiting the exhaust outlet.

11. An aftertreatment system configured to couple to a gas turbine system, comprising:
    a cooling unit configured to cool exhaust gases from the gas turbine system;
    a carbon dioxide ($CO_2$) treatment unit coupled to the cooling unit and configured to receive and to treat cooled exhaust gases with lithium hydroxide (LiOH);
    a LiOH supply unit coupled to the $CO_2$ treatment unit and configured to feed LiOH into the $CO_2$ treatment unit such that a reaction between LiOH and $CO_2$ occurs inside the $CO_2$ treatment unit to convert $CO_2$ into lithium carbonate (Li2CO3) and water (H2O);
    a valve assembly configured to regulate one or more flows into and out of the $CO_2$ treatment unit, wherein the valve assembly comprises one or more valves;
    an outlet coupled to the $CO_2$ treatment unit and configured to discharge treated exhaust gases; and
    a controller coupled to the aftertreatment system and programmed to control operation of the aftertreatment system;
    wherein the valve assembly comprises a first valve disposed between the cooling unit and the $CO_2$ treatment unit and a second valve disposed between the LiOH supply unit and the $CO_2$ treatment unit.

12. The system of claim 11, comprise a recycle unit coupled to the $CO_2$ treatment unit and configured to collect $Li_2CO_3$ and/or $H_2O$.

13. The system of claim 11, wherein the cooling unit is configured to cool the exhaust gases to a temperature at or below 149° C.

14. The system of claim 11, wherein the $CO_2$ treatment unit is configured to convert at least 60% of $CO_2$ into $Li_2CO_3$ and $H_2O$.

15. The system of claim 14, wherein the $CO_2$ treatment unit is configured to convert at least 85% of $CO_2$ into $Li_2CO_3$ and $H_2O$.

16. The system of claim 11, wherein the controller is programmed to control the first valve to regulate rate of the cooled exhaust gases into the $CO_2$ treatment unit.

17. The system of claim 11, wherein the controller is programmed to control the second valve to regulate amount and/or rate of LiOH fed into to the $CO_2$ treatment unit.

18. The system of claim 11, wherein the aftertreatment system is configured to be directly coupled to an exhaust outlet of the gas turbine system and configured to directly receive the exhaust gases exiting the exhaust outlet, and the cooling unit is directly coupled to the exhaust outlet of the gas turbine system and configured to directly receive the exhaust gases exiting the exhaust outlet.

* * * * *